United States Patent Office 3,146,276
Patented Aug. 25, 1964

3,146,276
HYDROCARBON PROCESS
Thomas D. Nevitt, Valparaiso, Ind., assignor to Standard Oil Company, Chicago, Ill., a corporation of Indiana
No Drawing. Filed Dec. 22, 1960, Ser. No. 77,519
6 Claims. (Cl. 260—666)

This application relates to a process for making ethyl cyclopentane.

Ethyl cyclopentane is useful as a chemical compound and as a intermediate in chemical manufacture. It may be used to prepare ethylene cyclopentane by dehydration of the ethyl side chain, and the ethylene cyclopentane may then be polymerized. Alternatively, the ethyl side chain may be oxidized to yield 2-cyclopentane ethanol which may be used as a solvent or in additional chemical processing. It has been unexpectedly discovered that ethyl cyclopentane can be made in large yield by isomerization of methyl cyclohexane over nickel tungsten sulfide catalyst under controlled conditions. Ethyl cyclopentane may then be separated from the effluent of the isomerization step.

The catalyst used in this process comprises sulfides of nickel and tungsten, hereinafter referred to as a nickel tungsten sulfide catalyst. The mol ratio of nickel to tungsten is preferably in the range of between about 0.5 to 5, advantageously in the range of 1 to 2. The catalyst may be made by treating an aqueous alkaline solution of a salt of thiotungstic acid with an aqueous solution of a water soluble nickel salt, then treating the resulting solution with an acid to precipitate sulfides of nickel and tungsten. The resulting precipitate is filtered, dried and formed into the desired shape. If desired, the mixture of sulfides is subjected to mild reducing conditions prior to use. Alternatively, the catalyst may be prepared by precipitation with hydrogen sulfide and hydrogen from an aqueous solution of tungstic acid and nickel nitrate. The catalyst may also be prepared by precipitating sulfides of nickel and tungsten from an ammoniacal solution of their salts by the simultaneous addition of an acid and hydrogen sulfide.

The catalyst as used may be in a variety of forms such as pellets, extrudates, granules or in other forms. Although a fixed bed operation is preferred, a fluidized bed operation is possible and if used the catalyst should be grounded to a size suitable therefor. The catalyst may, if desired, be used in combination with a support or carrying material such as alumina, magnesia, silica or similar metal oxides or mixtures thereof.

The feed to the process may be a petroleum naptha rich in methyl cyclohexane, preferably comprising at least 75 mol percent methyl cyclohexane, and advantageously comprising 90 mol percent or more methyl cyclohexane. Such a feed may be obtained from virgin naptha. A suitable feed comprising substantially pure methyl cyclohexane may readily be prepared by hydrogenating toluene.

Sulfur contaminants in the feed are not harmful to the nickel tungsten sulfide catalyst. It is preferred that unsaturated hydrocarbons, especially aromatic hydrocarbons, comprise less than about 10–15% of the feed, and that diolefins comprise less than about 5% of the feed. Excessive concentrations of aromatics and diolefins tend to form undesirable amounts of coke on the catalyst.

The process is operated under moderately high hydrogen partial pressures, in the range of between about 500 to 5,000 p.s.i.g., preferably about 1,000 to 2,500 p.s.i.g. The greater hydrogen partial pressures are used at higher temperatures. The hydrogen used does not need to be pure; a hydrogen make gas stream, comprising about 75–80 mol percent hydrogen, from the catalytic reforming of napthas is a suitable source of hydrogen. The presence of hydrogen sulfide in the hydrogen stream is not objectionable.

The chemical consumption of hydrogen is relatively low, being one mol of hydrogen for each mol of naphthene converted to a paraffin, plus any hydrogen consumed in hydrogenating olefins or aromatics in the feed. A certain small amount of hydrogen will be lost through mechanical means or through taking a drag stream, if the hydrogen is recycled, in order to avoid the build-up of normally gaseous hydrocarbons. The amount of hydrogen charged to the unit may be in the range of 1 to 20 mols per mol of feed, preferably in the range of 2 to 10 mols per mol of feed.

The contacting of the methyl cyclohexane and hydrogen with a catalyst is done in the vapor phase at temperatures in the range of between about 600 to 900° F., preferably in the range of 750 to 850° F., and at hydrogen partial pressures in the range of about 500 to 5,000 p.s.i.g., preferably within the range of about 1,000 to 2,500 p.s.i.g. The greater hydrogen partial pressures are used at the higher temperatures. Liquid hourly space velocities in the range of 0.05 to 2, advantageously in the range of about 0.2 to 1 and preferably in the range of about 0.2 to 0.6 are used. As used herein, liquid hourly space velocity is expressed as volumes of liquid feed per hour per volume of reactor occupied by the catalyst.

In a specific embodiment of this invention, a hydrocarbon stream comprising about 85 mol percent methyl cyclohexane, and the remainder primarily paraffinic hydrocarbons but including minor amounts of olefins and toluene is heated in a conventional furnace to a temperature of about 800° F., and the resulting vapors passed to a fixed bed reactor. Recycled hydrogen gas is mixed with feed at a point preferably located between the furnace and the reactor inlet, although the hydrogen may be added to the feed before feed is charged to the furnace. The reactor is loaded with crushed granules of nickel tungsten sulfide catalyst comprising about 1.5 mols of nickel per mol of tungsten. No supporting carrier is used.

The effluent from the reactor is cooled and the hydrogen and other noncondensibles separated therefrom in a high pressure separator. The hydrogen recycled gas stream removed from the high pressure separator may be recycled to the reactor or, if a source of fresh hydrogen is available for the reactor, the recycled gas stream may be otherwise disposed of. If the recycled gas stream is returned to the reactor, a drag stream may be optionally removed in order to prevent the build-up of normally gaseous hydrocarbons.

The liquid phase from the high pressure separator, preferably after depressuring, is fractionally distilled to separate therefrom the product ethyl cyclopentane. A cyclopentane product having a purity of 95 mol percent may be readily obtained. When maximum purity ethyl cyclopentane is desired, it is preferable to use two distillation towers in series, with the product ethyl cyclopentane being taken as the overhead from the down stream tower. By careful selection of feed and design and operation of separation facilities, a product of 98–99 mol percent purity may be obtained.

The process claimed herein was used to make ethyl cyclopentane. The steel reactor held 30 milliliters of crushed pellets of nickel tungsten sulfide catalyst. The catalyst comprised 17.9 weight percent nickel, 42.1 weight percent tungsten, and 40 percent sulfur. It had a particle density of 4.27 grams per milliliter and a surface area of 12.8 square meters per gram.

The feed was methyl cyclohexane having a purity of about 98–99 percent. Once through hydrogen was used at a rate of 1 liter of hydrogen per milliliter of feed, e.g., approximately 5 mols of hydrogen per mol of feed. The methyl cyclohexane feed was charged to the reactor at a liquid hourly space velocity of 0.41. The reactor was operated at 775° F. and a total pressure of 1,750 p.s.i.g.

The conversion of methyl cyclohexane to other compounds was 79.2 percent (by weight). Of the reacted products, 37.6 percent was ethyl cyclopentane, 19.7 percent dimethyl cyclopentanes, 32.3 percent $C_7$ paraffins, 7.5 percent was $C_6$ and lighter hydrocarbons, and 1.2 percent was $C_8$ and heavier hydrocarbons. The yield of toluene was only 1.7 percent.

A second run was made using the same reactor feed and process conditions, except that temperature was 800° F., the liquid hourly space velocity was 0.50 and the pressure was 1,685 p.s.i.g. 58.6 weight percent of the methyl cyclohexane was converted. The reaction products comprised 31.9 percent ethyl cyclopentane, 31.4 percent dimethyl cyclopentane, 21.1 percent $C_7$ paraffins, 10.6 percent $C_6$ hydrocarbons, 1.9 percent $C_5$ and lighter hydrocarbons, 3.1 percent toluene, and a trace of $C_8$ and heavier hydrocarbons.

As an illustration of the unexpectedness of the process claimed herein, a run was made using methyl cyclohexane feed and aluminum chloride as the catalyst. In this run 500 milliliters of methyl cyclohexane were refluxed at atmospheric pressure in a distillation column containing 30 grams of aluminum chloride. After about one-half hour of refluxing, it was found that 59 weight percent of the charge had been reacted. However, the ethyl cyclopentane content of the reaction products was less than 1 weight percent.

Having thus described the invention what is claimed is:

1. A process for making ethyl cyclopentane which process comprises contacting in a vapor phase hydrogen and a feed comprising methyl cyclohexane with a nickel tungsten sulfide catalyst at elevated temperatures and hydrogen partial pressures effective for the isomerization of methyl cyclohexane to ethyl cyclopentane and separating from the contacting step effluent a product rich in ethyl cyclopentane.

2. The process of claim 1 wherein said feed comprises at least about 75 mol percent methyl cyclohexane.

3. The process of claim 1 wherein said contacting is done at a temperature in the range of between about 600–900° F.

4. The process of claim 1 wherein said contacting is done at a hydrogen partial pressure in the range of between about 500 to 5,000 p.s.i.g.

5. The process of claim 1 wherein a liquid hourly space velocity in the range of between about 0.1 to 2 is used.

6. The process for making ethyl cyclopentane which process comprises contacting a feed comprising at least about 85% methyl cyclopentane and a hydrogen rich gas with a nickel tungsten sulfide catalyst at temperatures within the range of about 750 to 850° F., hydrogen partial pressures within the range of about 1,000 to 2,500 p.s.i., a liquid hourly space velocity within the range of about 0.2–0.6, separating from the effluent from the catalyst contact step a hydrogen rich recycle gas and a liquid phase rich in hydrocarbons, and separating by distillation from said liquid phase a product stream comprising at least about 95 mol percent ethyl cyclopentane.

References Cited in the file of this patent

UNITED STATES PATENTS

| | | |
|---|---|---|
| 2,399,927 | Howes et al. | May 7, 1946 |
| 2,422,798 | Pines | June 24, 1947 |
| 2,882,217 | Efroymson | Apr. 14, 1959 |
| 2,913,393 | Sarno | Nov. 17, 1959 |
| 2,915,571 | Haensel | Dec. 1, 1959 |
| 2,924,629 | Donaldson | Feb. 9, 1960 |
| 2,952,716 | Haensel | Sept. 13, 1960 |

FOREIGN PATENTS

| | | |
|---|---|---|
| 448,179 | Canada | Apr. 27, 1948 |

UNITED STATES PATENT OFFICE
CERTIFICATE OF CORRECTION

Patent No. 3,146,276                                      August 25, 1964

Thomas D. Nevitt

It is hereby certified that error appears in the above numbered patent requiring correction and that the said Letters Patent should read as corrected below.

Column 4, line 14, for "cyclopentane" read -- cyclohexane --.

Signed and sealed this 23rd day of February 1965.

(SEAL)
Attest:

ERNEST W. SWIDER                                    EDWARD J. BRENNER
Attesting Officer                                        Commissioner of Patents